(12) United States Patent
Dunn

(10) Patent No.: US 7,937,930 B1
(45) Date of Patent: May 10, 2011

(54) SEMICLOSED BRAYTON CYCLE POWER SYSTEM WITH DIRECT HEAT TRANSFER

(75) Inventor: Paul M. Dunn, Wakefield, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 07/926,199

(22) Filed: Aug. 7, 1992

(51) Int. Cl.
F02C 7/10 (2006.01)
(52) U.S. Cl. ........................... 60/39.511; 60/727
(58) Field of Classification Search .................. 60/39.02, 60/39.05, 39.461, 39.511, 727
See application file for complete search history.

(56) References Cited

U.S. PATENT DOCUMENTS

| | | | | |
|---|---|---|---|---|
| 1,688,761 A | * | 10/1928 | Sperry | 60/39.05 |
| 2,303,381 A | * | 12/1942 | New | 60/39.02 |
| 2,325,619 A | * | 8/1943 | Lysholm | 60/39.05 |
| 3,101,592 A | * | 8/1963 | Robertson et al. | 60/39.05 |
| 3,134,228 A | * | 5/1964 | Wolowsky et al. | 60/39.461 |
| 3,657,879 A | * | 4/1972 | Ewbank et al. | 60/39.05 |
| 3,877,218 A | * | 4/1975 | Nebgon | 60/39.05 |
| 5,177,952 A | * | 1/1993 | Stone | 60/39.05 |

* cited by examiner

*Primary Examiner* — Christopher P Ellis
(74) *Attorney, Agent, or Firm* — James M. Kasischke; Michael P. Stanley; Jean-Paul A. Nasser

(57) ABSTRACT

A semiclosed power system utilizing a Brayton cycle with combustion occurring between diesel fuel and $O_2$ in direct contact with an inert gas. The inert gas and products of combustion form a heated working fluid which is expanded in a turbine to provide power. The expanded working fluid is then used in a regenerator to heat the cooler, compressed inert gas before the inert gas is transferred to the combustor. The expanded working fluid is cooled by direct contact with seawater causing the steam within the expanded working fluid to condense to water and $CO_2$ in the working fluid to be dissolved in the water and seawater. The inert gas is separated from the fluids and recycled within the system. The fluids are pumped overboard.

7 Claims, 1 Drawing Sheet

SEMICLOSED BRAYTON CYCLE POWER SYSTEM WITH DIRECT HEAT TRANSFER

STATEMENT OF GOVERNMENT INTEREST

The invention described herein may be manufactured and used by or for the Government of the United States of America for governmental purposes without the payment of any royalties thereon or therefor.

This patent application is copending with the related applications by the same inventor filed on the same date as subject patent entitled Closed Cycle Brayton Propulsion System with Direct Heat Transfer, Ser. No. 07/926,116, filed 7 Aug. 1992 Closed Brayton Cycle Direct Contact Reactor/Storage Tank with Chemical Scrubber, Ser. No. 07/926,090, filed 7 Aug. 1992 Brayton Cycle Direct Contact Reactor/Storage Tank with $O_2$ Afterburner, Ser. No. 07/926,200, filed 7 Aug. 1992 Brayton Cycle Power System with Direct Combustion Heat Transfer, Ser. No. 07,926,115, filed 7 Aug. 1992.

BACKGROUND OF THE INVENTION (1) Field of the Invention

The present invention relates to a system and a process for providing power using a semiclosed Brayton cycle with direct heat transfer. More particularly the invention relates to a diesel fueled Brayton cycle system using an inert gas as a major portion of the working fluid. This system is of particular use in torpedo and unmanned underwater vehicle propulsion systems.

(2) Description of the Prior Art

Current underwater propulsion systems are typically closed Rankine cycle power systems utilizing lithium as a fuel, a chlorofluorocarbon as an oxidant, and water as a working fluid. In a Rankine system, the working fluid is compressed, heated until vaporization, and then expanded through a turbine to produce power. Upon exiting the turbine, the low pressure vapor is condensed to a liquid, and the cycle is repeated. In a typical underwater propulsion system the working fluid is heated as it passes through heat transfer tubes that are wrapped to form a cylindrical annulus within the system's heat exchanger. The center of the cylinder contains liquid metal fuel to heat the working fluid being carried by the heat transfer tubes. The working fluid, water, and the liquid metal fuel, lithium, react chemically with one another; therefore, a leak in the heat transfer tubes causes a violent reaction which generates a significant amount of heat and gas resulting in failure of the heat exchanger and the underwater device. Furthermore, should a leak occur in a land based system, the system will release a toxic cloud of LiOH into the environment. Other problems the phase change of the working fluid, severe stress of the oxidant injectors due to high reaction zone temperatures, and slow start up time.

An alternative to the closed cycle Rankine power system is a closed or semiclosed Brayton cycle system. In a Brayton cycle, there is no phase change and accordingly, no noise associated therewith. The Brayton cycle is also more efficient than the Rankine cycle despite the fact that more energy is required to compress a gas than to pump an equivalent mass of liquid. Prior art Brayton cycle systems cannot be used in underwater systems because the components of the Brayton cycle, principally the conventional Brayton heat exchanger, will not fit in the restricted space available in underwater vehicles.

A compact heat exchanger can be made by increasing gas velocity through the heat exchanger to achieve higher heat transfer coefficients; however, this results in greater heat exchanger pressure drop. Increasing gas velocity is used successfully in Rankine cycle systems because pump power is a small fraction of gross power (1/50) and pump losses are small by comparison. Accordingly, there is no significant reduction in cycle efficiency. In the Brayton cycle, however, compressor power is typically a large part of the gross power (½); therefore, small increases in gas velocity and heater pressure drop reduce the Brayton cycle efficiency below that of the Rankine cycle.

My other listed inventions with which this application is copending relate to direct contact closed Brayton cycle power systems using liquid metal fuel. The size and weight penalty of the Brayton's hot side heat exchanger is eliminated by direct contact heat transfer between the working fluid which is an inert gas such as helium, argon, xenon, or a mixture of inert gases, and a liquid metal bath of a material such as lithium, sodium, potassium, aluminum, magnesium, or an alloy.

SUMMARY OF THE INVENTION

Accordingly, it is a general purpose and object of the present invention to provide an improved Brayton cycle power system. A further object of this invention is that the system be compact and capable of higher power densities than the molten metal versions and have the added advantage of burning a hydrocarbon fuel with oxygen.

These and other objects are accomplished with the present invention by providing a semiclosed system utilizing a Brayton cycle. In this invention, combustion occurs in a combustor between diesel fuel and $O_2$ with an inert gas present. During combustion, a heated high pressure working fluid of steam, $CO_2$, and inert gas is formed. The heated working fluid is expanded in a turbine and then used in a regenerator to heat the cooler, compressed working fluid before this fluid is transferred to the combustor. The expanded working fluid is mixed with seawater causing the steam within the expanded working fluid to condense to water. The $CO_2$ is dissolved in the water and seawater, and the inert gas is separated from the other components. The inert gas is recycled within the system, and the water, seawater, and $CO_2$ solution is pumped overboard.

BRIEF DESCRIPTION OF THE DRAWINGS

A more complete understanding of the invention and many of the attendant advantages thereto will be readily appreciated as the invention becomes better understood by reference to the following detailed description when considered in conjunction with the accompanying drawing wherein.

DESCRIPTION OF THE PREFERRED EMBODIMENT

Figure 1:
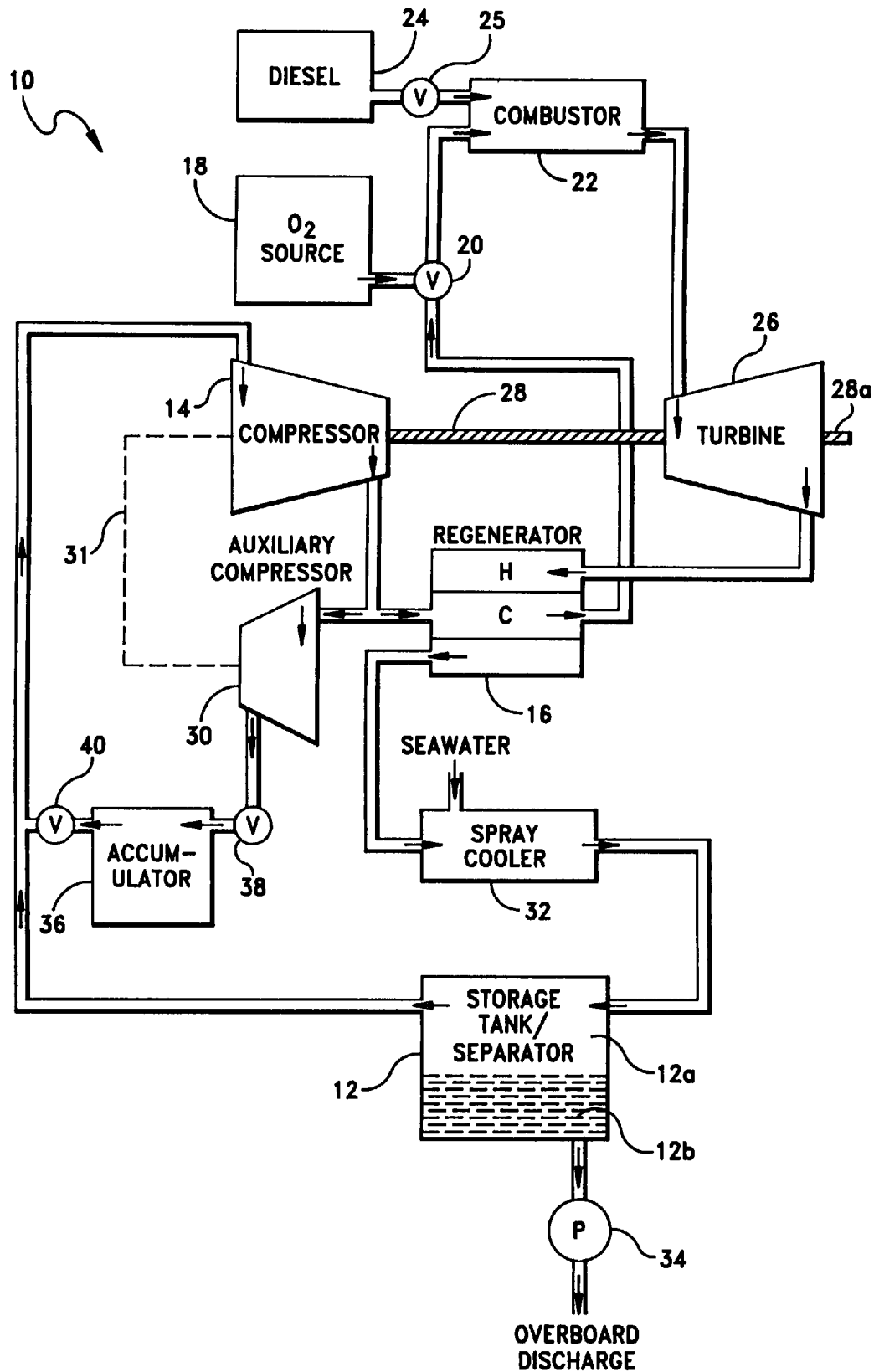
FIG. 1 shows a diagram of a semiclosed Brayton cycle with direct heat transfer in accordance with the present invention.

Referring now to FIG. 1 there is shown a semiclosed Brayton cycle power system 10. System 10 has a storage tank/separator 12 initially containing an inert gas 12a. Preferably, the inert gas is argon; however, the gas can also be a mixture of helium and xenon. The inert gas is compressed in a compressor 14 and transported to a regenerator 16 wherein the gas is partially heated. Upon exit from regenerator 16 the partially heated gas is mixed with oxygen from $O_2$ source 18 by mixing valve 20. The resulting gas mixture is transported to a combustor 22. Diesel fuel from diesel fuel tank 24 is also transported to combustor 22 via diesel fuel control valve 25. Combustion of diesel fuel and oxygen occurs in combustor 22 by conventional means. The diluent inert gas mixed with oxygen acts to reduce the combustion temperature and prevent damage to combustor 22. Combustion results in the formation of a steam, $CO_2$, and hot inert gas working fluid. The steam/$CO_2$/inert gas working fluid is communicated to a turbine 26 where the working fluid is expanded driving output shaft 28. Output shaft 28 is mechanically connected to drive compressor 14 and auxiliary compressor 30. Shaft extension 28a allows power to be withdrawn from system 10. The mechanical connection between turbine 26 and auxiliary compressor 30 is symbolically shown by dashed line 31. The steam/$CO_2$/inert gas working fluid after being expanded in turbine 26 is routed to regenerator 16. The remaining heat from the working fluid mixture is used to preheat the inert gas as mentioned previously. Regenerator 16 operates by conventional means. There is no direct contact in the regenerator 16 between the inert gas from the compressor 14 and the working fluid mixture of steam/$CO_2$/inert gas. The steam/$CO_2$/inert gas working fluid is then transmitted to a spray cooler/condenser 32 and cooled by direct contact with large amounts of cold seawater. Spray cooler/condenser 32 is a constant enthalpy cooler providing a large amount of shearing and mixing between the working fluid and the seawater to promote dissolution of the $CO_2$ and condensation of the steam. The seawater, water, $CO_2$ and inert gas mixture is then routed to storage tank/separator 12. The fluid components 12b, water and seawater with $CO_2$ dissolved therein, are allowed to settle to the bottom of storage tank/separator 12 where they can be pumped overboard by a seawater discharge pump 34. The remaining gas 12a, mostly inert gas with a trace of $CO_2$, is routed back to compressor 14 inlet.

As with any Brayton propulsion system speed and power are regulated by adding or removing mass from the system. Auxiliary compressor 30 is available to remove the inert gas from compressor 14 discharge and forward the inert gas to an accumulator 36 through an accumulator input valve 38. Inert gas can also be added to the system from accumulator 36 through an accumulator output valve 40 to compressor 14. For most power levels and depths of operation, auxiliary compressor 30 will not be brought into operation.

There has therefore been described a new direct contact Brayton power system that utilizes an inert gas. Because of its use of hydrocarbon fuel, torpedo room refueling of a recovered underwater vehicle is possible. Eliminating the liquid metal fuels of previous designs reduces environmental hazards and increases community acceptance. This approach has the advantage of high power levels since both the heating and cooling processes are via direct contact. The direct contact combustion of diesel fuel and $O_2$ is a highly developed low risk technology. Very high temperatures are now easily achieved resulting in improved cycle efficiency.

An alternate method of start up requiring slight alterations is by blowdown of the accumulator 36 to the turbine 26 rather than blowdown of storage tank/separator 12 in the preferred embodiment. The transient response of the present system is much improved over those previously designed.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A semiclosed Brayton cycle power system comprising:
   a storage tank/separator containing an inert gas;
   a compressor connected to said storage tank/separator to receive and compress said inert gas;
   a regenerator connected to said compressor to receive and to partially heat said compressed inert gas;
   an $O_2$ source connected with said regenerator to mix $O_2$ from said $O_2$ source with said partially heated, compressed inert gas from said regenerator;
   a diesel fuel tank for providing diesel fuel;
   a combustor connected to said regenerator and said $O_2$ source for receiving a mixture of partially heated inert gas and $O_2$, and connected to said diesel fuel tank for receiving diesel fuel, said combustor providing through combustion a heated working fluid mixture of steam, inert gas and $CO_2$;
   a turbine in communication with said combustor for receiving and expanding said heated working fluid;
   a power transfer means connected between said turbine and said compressor, said transfer means enabling said turbine to drive said compressor;
   said regenerator being connected to said turbine for receiving said expanded working fluid and utilizing said expanded working fluid for said partial heating of said inert gas;
   a spray cooler/condenser connected to said regenerator for receiving seawater and said expanded working fluid and cooling said expanded working fluid by direct application of said seawater to said expanded working fluid, said steam in said expanded working fluid condensing to water and mixing with said seawater, said carbon dioxide in said expanded working fluid dissolving in said water and seawater, and said inert gas in said expanded working fluid remaining in the gaseous state; and
   said storage tank/separator being connected to said spray cooler/condenser for receiving said inert gas and said mixture of seawater, water and carbon dioxide, and said storage tank further connected for discharging said mixture of seawater, water and carbon dioxide.

2. A semiclosed Brayton cycle power system according to claim 1 further comprising:
   an auxiliary compressor connected to be driven by said turbine, said auxiliary compressor further connected for removing and further compressing a preselected portion of said inert gas from said compressor; and
   an accumulator connected to said auxiliary compressor for receiving said inert gas compressed by said auxiliary compressor.

3. A semiclosed Brayton cycle power system according to claim 2 further comprising:
   said compressor being connected to said accumulator for receiving inert gas from said accumulator; and
   a pressure reducing valve connected between said accumulator and said compressor with said accumulator being on the higher pressure side of said pressure reducing valve.

4. A semiclosed Brayton cycle power system according to claim 3 further comprising a flow through valve located between said auxiliary compressor and said accumulator for preventing backflow from said accumulator through said auxiliary compressor.

5. A Brayton cycle process comprising the steps of:
   supplying inert gas from a supply tank/separator to a compressor;
   compressing said inert gas in said compressor;
   preheating said compressed inert gas in a regenerator;
   mixing said heated compressed inert gas with oxygen;
   combusting said oxygen in said oxygen and heated inert gas mixture with diesel fuel in a combustor to form a hot high pressure steam, carbon dioxide, and inert gas working fluid;

expanding said hot, high pressure working fluid in a turbine to extract energy therefrom;

supplying said hot, expanded working fluid to said regenerator for preheating said inert gas;

cooling said hot, expanded working fluid by mixing said working fluid with seawater to form a liquid and said inert gas, said carbon dioxide being dissolved in said liquid;

separating said liquid from said inert gas in said storage tank/separator;

recirculating said inert gas; and pumping said separated liquid from said storage tank/separator from said cycle.

6. A Brayton cycle process according to claim 5 comprising the additional step of removing a portion of said inert gas from said compressor to an accumulator.

7. A Brayton cycle process according to claim 6 comprising the additional steps of:

removing said inert gas from said accumulator;

expanding said removed inert gas; and forwarding said expanded, removed inert gas to said compressor.

\* \* \* \* \*